US011846275B2

(12) United States Patent
May et al.

(10) Patent No.: US 11,846,275 B2
(45) Date of Patent: Dec. 19, 2023

(54) LIQUID DISPENSING (71) Applicant: QUIP NYC INC., Brooklyn, NY (US)

(72) Inventors: William Thomas May, South Orange, NJ (US); Simon Enever, Brooklyn, NY (US); Paul Koh, New York, NY (US); Max Wood-Lee, Brooklyn, NY (US); James Krause, Queens, NY (US); Jonathan Fratti, Brooklyn, NY (US)

(73) Assignee: QUIP NYC, INC., Brooklyn Heights, NY (US)

( * ) Notice: Subject to any disclaimer, the term of this patent is extended or adjusted under 35 U.S.C. 154(b) by 0 days.

(21) Appl. No.: 17/581,662

(22) Filed: Jan. 21, 2022

(65) Prior Publication Data
US 2022/0228583 A1 Jul. 21, 2022

Related U.S. Application Data (60) Provisional application No. 63/140,208, filed on Jan. 21, 2021.

(51) Int. Cl.
F04B 23/02 (2006.01)
F04B 43/00 (2006.01)
(Continued)

(52) U.S. Cl.
CPC ........ F04B 23/028 (2013.01); B05B 11/1047 (2023.01); B05B 11/1087 (2023.01); F04B 43/0063 (2013.01); F04B 43/026 (2013.01)

(58) Field of Classification Search
CPC .. F04B 23/028; F04B 43/026; F04B 43/0063; B05B 11/3047; B05B 11/3087; B05B 11/0038; G01F 11/028
(Continued)

(56) References Cited

U.S. PATENT DOCUMENTS 2,593,591 A * 4/1952 Menkin ............... B05B 11/3007
222/309
2,774,517 A * 12/1956 Teegardin ............ A47K 5/1205
222/380
(Continued)

FOREIGN PATENT DOCUMENTS

CN 201712871 U 1/2011
CN 105752473 A 7/2016
EP 1297897 A1 4/2003

OTHER PUBLICATIONS

PCT; International Search Report and Written Opinion, International Application No. PCT/US2022/013393; dated Apr. 13, 2022; 14 pages.
(Continued)

Primary Examiner — Lien M Ngo
(74) Attorney, Agent, or Firm — The Marbury Law Group, PLLC (57) ABSTRACT A device for dispensing a liquid may include a basin defining a reservoir, a pump including a barrel and a spring, the barrel coupled to the basin, the barrel defining a cavity, and the spring disposed in the cavity, and an actuator at least partially disposed in the reservoir, the actuator defining a first orifice, a second orifice, and a lumen extending between the first orifice and the second orifice, the reservoir in fluid communication with the lumen via the first orifice, the actuator depressible to move the second orifice in a first direction defined from the reservoir toward the cavity of the barrel, and the spring of the pump biasing the actuator to move in a second direction defined from the cavity of the barrel toward the reservoir.

18 Claims, 8 Drawing Sheets (51) Int. Cl.
*F04B 43/02* (2006.01)
*B05B 11/10* (2023.01)

(58) Field of Classification Search
USPC .............. 222/321.9, 321.7, 207, 154–159;
220/23.83, 23.88
See application file for complete search history.

(56) References Cited

U.S. PATENT DOCUMENTS

| | | |
|---|---|---|
| 3,246,807 A | 4/1966 | Micallef |
| 4,757,922 A * | 7/1988 | Landecker .......... B05B 11/3001 222/321.6 |
| 8,177,101 B1 | 5/2012 | Blake |
| 10,499,774 B1 * | 12/2019 | Ryan ..................... A47K 5/1205 |
| 10,591,337 B1 * | 3/2020 | Neuhalfen .............. B05B 1/267 |
| 2011/0079613 A1 * | 4/2011 | Chih ..................... G01F 11/028 222/158 |
| 2012/0228335 A1 * | 9/2012 | Santoni ................ B05B 11/306 222/321.9 |
| 2015/0090738 A1 * | 4/2015 | Caporale ............ B05B 11/3001 222/205 |
| 2015/0296957 A1 | 10/2015 | Megaro et al. |
| 2020/0102138 A1 * | 4/2020 | Eng .................... B05B 11/0086 |
| 2021/0196025 A1 * | 7/2021 | Daviot ................ A45D 34/045 |
| 2022/0258193 A1 * | 8/2022 | Perignon ............ B05B 11/3047 |

OTHER PUBLICATIONS

The International Bureau of WIPO, "International Preliminary Report on Patentability," in related International Application No. PCT/US2022/013393; dated Aug. 3, 2023 (8 pages).

\* cited by examiner

FIG. 4E

LIQUID DISPENSING

CROSS-REFERENCE TO RELATED APPLICATIONS

This application claims the benefit of priority to U.S. Provisional Patent Application No. 63/140,208, filed Jan. 21, 2021, the entire contents of which are hereby incorporated herein by reference.

BACKGROUND

Liquids with active ingredients are often diluted to a precise concentration suitable for achieving effectiveness for a given application while nevertheless taking into consideration other factors, such as safety, cost, and/or end-user preference. For example, mouthwash is typically sold with a formulation of active ingredients diluted to concentration that is effective in freshening breath and allows the consumer to use the mouthwash directly from the container— without any additional preparation. While this affords certain convenience, storing a supply of a diluted mouthwash formulation typically requires the use of a large container. Such containers are unwieldy and can take up a large amount of storage and/or counter space, which may be limited in a household setting such as in a bathroom.

SUMMARY

According to one aspect, a device for dispensing a liquid may include a basin defining a reservoir, a pump including a barrel and a spring, the barrel coupled to the basin, the barrel defining a cavity, and the spring disposed in the cavity, and an actuator at least partially disposed in the reservoir, the actuator defining a first orifice, a second orifice, and a lumen extending between the first orifice and the second orifice, the reservoir in fluid communication with the lumen via the first orifice, the actuator depressible to move the second orifice in a first direction defined from the reservoir toward the cavity of the barrel, and the spring of the pump biasing the actuator to move in a second direction defined from the cavity of the barrel toward the reservoir.

In some implementations, the first direction may be opposite the second direction along an axis defined by the lumen.

In some implementations, the pump may further include a stopper disposed in the cavity, the barrel defines an inlet region in fluid communication with the cavity, and the stopper is movable relative to the inlet region to control a flow of the liquid into the cavity via the inlet region. As an example, the spring may be in mechanical communication with the stopper, and movement of the spring in the first direction defined from the reservoir toward the cavity positions the stopper along the inlet region of the cavity to restrict the flow of the liquid into the cavity via the inlet region.

In certain implementations, movement of the actuator in the first direction may be limited to retain the first orifice in the reservoir as the actuator is depressed to move the second orifice in the first direction. Further, or instead, movement of the actuator in the second direction may be limited to retain the first orifice in the reservoir as the spring moves the actuator in the second direction from the cavity of the barrel toward the reservoir.

In some implementations, the actuator may include a contact surface, and the actuator is depressible along the contact surface to move the second orifice in the first direction from the reservoir toward the cavity of the barrel. In some instances, the reservoir of the basin may have a first volume, the actuator is depressible in the first direction along the contact surface to displace a second volume of the liquid from the cavity into the reservoir via the first orifice, and the first volume of the reservoir is greater than or equal to the second volume of the liquid displaced from the cavity into the reservoir. As an example, the reservoir may be sized such that, as the second volume of the liquid is displaced from the cavity into the reservoir, the liquid remains below the contact surface of the actuator as the spring moves the actuator in the second direction. Further, or instead, the basin may have an edge portion circumscribing the actuator such that the contact surface of the actuator is below the edge portion of the basin as the actuator moves back and forth in the first direction and the second direction. The edge portion of the basin may be curved in a direction away from the contact surface of the actuator. Additionally, or alternatively, the contact surface of the actuator may be above the first orifice as the actuator moves in the first direction. The actuator may, for example, include a stem and a button, the stem defines the first orifice, the second orifice, and the lumen, the contact surface is along the button, and the button is coupled to the stem such that the button is depressible by the user to move the actuator in the first direction. In some instances, the device may further include a first set of screw threads defining a first opening, wherein a portion of the actuator is movable through the first opening. A portion of the actuator movable through the first opening may be concentric with the first set of screw threads in some instances. Additionally, or alternatively, the device may further include a second set of screw threads defining a second opening circumscribing the first set of screw threads, wherein the second set of screw threads is concentric with the first set of screw threads. Further, or instead, the device may further include a bottle securable to at least one of the first set of screw threads or the second set of screw threads, wherein the pump is at least partially disposed in the bottle when the bottle is secured to one or more of the first set of screw threads or the second set of screw threads.

In certain implementations, the device may further include a housing supporting the basin. The housing may, for example, include a first section and a second section releasably securable to one another to access the pump.

In some implementations, the device may further include a cup, wherein the actuator and the basin define a space therebetween, and the cup is positionable in the space between the actuator and the basin to cover the actuator.

BRIEF DESCRIPTION OF THE DRAWINGS

Like reference symbols in the various drawings indicate like elements.

DETAILED DESCRIPTION

Embodiments will now be described more fully hereinafter with reference to the accompanying figures, in which exemplary aspects are shown. The foregoing may, however, be embodied in many different forms and should not be construed as limited to the examples set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, unless otherwise specified or made clear from the context, the term "liquid" shall be understood to be any flowable material that includes a nearly incompressible fluid that has no independent shape but has a volume that is definite and independent of pressure. Thus, for example, a liquid may include a single component in some cases or multiple components in a solution in other cases. Additionally, or alternatively, a liquid may include particles carried in the bulk volume of a solvent, with the resulting heterogeneous mixture including a suspension, a colloid, or a combination thereof. Further or instead, the liquid dispensed using the devices and methods described herein may include any one or more active ingredients, including active ingredients having effectiveness, economic value, and/or safety derived from being dispensed in controlled amounts. Unless otherwise specified or made clear from the context, it shall be understood that any one or more of the various different devices and methods described herein may be used to control manual dispensing of any one or more liquids having consumable and/or non-consumable end-uses, particularly in applications in which it is generally desirable to avoid touching the liquid that is being manually dispensed and the volumetric envelope of the device is a significant consideration. While such end-uses are many and varied, for the sake of clear and efficient description, devices and methods of the present disclosure are described in the context of dispensing mouthwash (also known as mouth-rinse or oral rinse), which may be for cosmetic purposes (e.g., controlling or reducing bad breath) and/or therapeutic purposes (e.g., reducing microbial load in the mouth).

Referring now to FIGS. 1A-1F, a device 100 for dispensing a liquid 101 may include a basin 102, a pump 104, and an actuator 106. The basin 102 may define a reservoir 108, and the actuator 106 may be at least partially disposed in the reservoir 108. The actuator 106 may be depressible (e.g., manually depressible) to activate the pump 104, such as according to any one or more of the various different examples described herein. In use, described in greater detail below, actuation of the pump 104 through depression of the actuator 106 may draw a controlled amount of the liquid 101 from a source (e.g., a bottle 140) into the reservoir 108. As also described in greater detail below, although the actuator 106 is at least partially disposed in the reservoir 108, the actuator 106, the basin 102, and the pump 104 are sized and oriented relative to one another such that the liquid 101 pumped into the reservoir 108 remains below at least a portion of the actuator 106 contacted by a user to depress the actuator 106. That is, during normal operation of the device 100 on a stable surface, the liquid 101 dispensed into the reservoir 108 does not come into contact with the user's hand or with any portion of the actuator 106 that comes into contact with the user's hand. Thus, advantageously, the actuator 106 at least partially disposed in the reservoir 108 of the basin 102 facilitates forming the device 100 within an efficient volumetric envelope (useful, for example, for storage in space-constrained areas such as bathroom or kitchen countertops) while maintaining hygienic standards by reducing the likelihood of contact between the liquid 101 and any potentially contaminated or unhygienic surfaces. Further or instead, the liquid 101 may be in a concentrated form, such as a concentrated form of mouthwash requiring dilution with water prior to use. In such use cases, controlled dispensing of a concentrated form of the liquid 101 from the device 100 may provide a user with a dose of active ingredients that can be reliably and repeatably diluted at or near the point of end-use. Thus, as compared to storing large containers of prediluted mouthwash or other consumable liquid, dispensing a concentrated form of the liquid 101 from the device 100 as described herein may facilitate volumetrically efficient storage of many doses of the active ingredients on a countertop or other convenient surface, while having little or no impact on end-user consumption of the active ingredients in a prescribed or recommended concentration. In turn, as compared to the storage and handling of large and often unwieldy containers of diluted mouthwash, the combination of convenience and effectiveness afforded by the device 100 in dispensing a concentrated form of the liquid 101 may promote the habit of using the liquid 101 as part of a regular (e.g., daily) oral hygiene routine.

In general, the actuator 106 may include a first orifice 116, a second orifice 118, and a lumen 120 extending between the first orifice 116 and the second orifice 118. The reservoir 108 may be in fluid communication with the lumen 120 via the first orifice 116. As described in greater detail below, the actuator 106 may be depressible to move the second orifice 118 in a first direction D1 from the reservoir 108 toward the pump 104, and the pump 104 may bias the actuator 106 to move in a second direction D2 toward the reservoir 108. For example, the first direction D1 and the second direction D2 may be opposite one another along an axis 121 defined by the lumen 120, as may be useful for efficiently transferring mechanical force on the actuator 106 in the first direction D1 into a pumping force to move the liquid 101 in the second direction D2 and, ultimately, into the reservoir 108 of the basin 102.

In certain implementations, movement of the actuator 106 in the first direction D1 and/or in the second direction D2 may be limited to maintain the first orifice 116 within the reservoir 108 as the actuator 106 is depressed and then released. Maintaining the first orifice 116 within the reservoir 108 may be useful, for example, for maintaining an appropriate pressure differential between the pump 104 and the basin 102 during one or more phases of pumping associated with movement of the actuator 106 in the first direction D1 and in the second direction D2. Further, or instead, limiting movement of the actuator 106 such that the first orifice 116 remains within the reservoir 108 of the basin 102 throughout the pumping operation may reduce the likelihood of the first orifice 116 becoming clogged and/or the actuator 106 becoming stuck in a depressed position. Additionally, or alternatively, movement of the actuator 106 in the second direction D2 (the direction away from the pump and toward the reservoir) may be limited to maintain the actuator 106 within the reservoir 108 of the basin 102 throughout the full range of movement of the actuator 106 in the second direction D2 as the pump 104 biases movement of the actuator 106 in the second direction D2.

In some instances, the actuator 106 may include a contact surface 129, and the actuator 106 may be depressible along the contact surface 129 to move the second orifice 118 of the actuator 106 in the first direction D1 from the reservoir 108 toward the pump 104. The contact surface 129 may be, for example, along the axis 121 defined by the lumen 120 of the actuator 106 to facilitate efficient transfer of mechanical force from the actuator 106 to the pump 104 along the axis 121. Further or instead, the contact surface 129 may be a planar surface that is readily depressible by a user. Further or instead, the contact surface 129 may span a substantial portion (e.g., greater than about 50 percent) of the reservoir 108 along a dimension transverse to the axis 121 defined by the lumen 120, as may be useful for using the contact surface 129 to reduce the likelihood of contaminants entering the reservoir 108.

Additionally, or alternatively, the actuator 106 may include a stem 128 and a button 130. The contact surface 129 may be along the button 130, providing a broad user-facing surface upon which a user may press. Further or instead, the button 130 may be shaped like a cap or cowling in a direction away from the contact surface 129, as may be useful for limiting the ingress of contaminants into the reservoir 108. The stem 128 may define one or more of the first orifice 116, the second orifice 118, and the lumen 120. The stem 128 may be coupled (e.g., directly or indirectly) to the button 130 such that depressing the button 130 results in corresponding movement of the stem 128 along the first direction D1 and the second direction D2, respectively, to move one or more of the first orifice 116, the second orifice 118, and the lumen 120 to pump the liquid 101 into the reservoir 108 according to the techniques described herein. For example, the button 130 may be coupled to the stem 128 such that a portion of the button 130 (e.g., the contact surface 129) remains above the liquid 101 entering the reservoir 108 as the actuator 106 moves in the second direction D2, thus reducing the likelihood of contamination of the reservoir 108 or the liquid 101 in the reservoir 108 over repeated uses of the device 100.

In some instances, the button 130 may include a side wall 131 defining a hollow space circumscribing the first orifice 116. In use, as the liquid 101 is ejected from the first orifice 116, the side wall 131 may help direct the liquid 101 in a direction into the reservoir 108 and away from the contact surface 129, decreasing the likelihood that the liquid 101 will splash out of the basin 102 and/or onto the contact surface 129. In some instances, the stem 128 may be removably secured to the button 130. This may, for example, facilitate cleaning or clearing the stem 128 and/or the button 130.

In general, the pump 104 may include a barrel 110 and a spring 112, with the barrel 110 defining a cavity 114 and the spring 112 disposed in the cavity 114. The barrel 110 may be coupled to the basin 102. While such coupling may include direct coupling in some implementations, the barrel 110 may be indirectly coupled to the basin 102 using one or more intermediate structures in other implementations. For example, the barrel 110 may be coupled to the basin 102 via a collar 231 useful for separately mounting the barrel 110 and the basin 102, thus promoting modularity of components, and/or for absorbing unintended forces that may interrupt fluid communication between the cavity 114 and the basin 102. Further, or instead, the collar 231 may be useful for supporting other components. For example, as described in greater detail below, the collar 231 may support a replaceable source of the liquid 101, with the collar 231 providing resistance to unintended forces as the source of the liquid 101 is removed and replaced.

The actuator 106 may be depressible to move the second orifice 118 in the first direction D1 defined from the reservoir 108 toward the cavity 114 of the barrel 110, and the spring 112 of the pump 104 may bias the actuator 106 to move in the second direction D2 defined from the cavity 114 of the barrel 110 toward the reservoir 108. For example, the actuator 106 may be at least partially disposed in the cavity 114 of the barrel 110, with the actuator 106 engaged against the spring 112 in the cavity 114 of the barrel 110.

As the actuator 106 is depressed (e.g., by pressing on the contact surface 129 of the button 130) to move the second orifice 118 in the first direction D1, the liquid 101 in the cavity 114 may be forced into the lumen 120, via the second orifice 118 (e.g., filling the lumen 120 with the liquid 101 in some cases). The same motion of the actuator 106 to move the second orifice 118 in the first direction D1 may deform the spring 112 from resting state to a compressed state in the cavity 114. As the actuator 106 is released through removal of a user-provided force, the spring 112 may return from the compressed state to the resting state. In turn, the force of the spring 112 returning to the resting state from the compressed state in the cavity 114 biases the actuator 106 to move in the second direction D2 to an original position within the reservoir 108 of the basin 102. As the actuator 106 moves in the second direction D2 to return to the original position within the reservoir 108, the liquid 101 drawn into the lumen 120 via the second orifice 118 may move from the lumen 120 and into the reservoir 108, via the first orifice 116.

In view of the foregoing, it shall be appreciated that depressing the actuator 106 and releasing the actuator 106 represents one complete pumping cycle that results in a controlled quantity of the liquid 101 moving from the cavity 114 into the basin 102. With the actuator 106 biased to return to the original position, the user may repeat the press-and-release process to dispense another controlled amount of the liquid 101, and this may be repeated as necessary or desired. It shall be appreciated that the quantity of the liquid 101 may vary slightly from cycle to cycle, given such factors as dimensional tolerances, variations in applied force, and the state of the spring 112 between successive pumping cycles. While the spring 112 may be a coil-spring in some implementations, it shall be appreciated that any one or more other types of springs may be additionally or alternatively used to bias the actuator 106 to move in the second direction D2.

In some instances, the pump 104 may further, or instead, include a stopper 124 disposed in the cavity 114 of the barrel 110. For example, the barrel 110 may define an inlet region 126 in fluid communication with the cavity 114, and the stopper 124 may be movable relative to the inlet region 126 to control a flow of dispensing liquid into the cavity 114 via the inlet region 126. The stopper 124 may act as a one-way valve. For example, the stopper 124 may be sized relative to the inlet region 126 to block the liquid 101 in the cavity 114 leaving the cavity 114 through the inlet region 126 as the actuator 106 is depressed to move the second orifice 118 of the actuator 106 in the first direction D1 to move the liquid 101 into the lumen 120, via the second orifice 118, as described above.

As the actuator 106 moves in the second direction D2 to move a first quantity of the liquid 101 into the reservoir 108 as part of an initial pumping cycle, pressure may decrease within the cavity 114, resulting in a pressure differential across the stopper 124 seated in the inlet region 126. With lower pressure within the cavity 114, the stopper 124 may become unseated from the inlet region 126 (see, e.g., FIG. 1E in which the actuator 106 is in an intermediate position) and a second quantity of the liquid 101 may be drawn into the cavity 114 from a source (e.g., a bottle, as described in greater detail below). This second quantity of the liquid 101 may remain in the cavity 114 until the actuator 106 is depressed again as part of a subsequent pumping cycle. In certain instances, the spring 112 may be in mechanical communication with the stopper 124, and movement of the spring 112 in the first direction D1 defined from the reservoir 108 toward the cavity 114 positions the stopper 124 along the inlet region of the cavity to restrict the flow of the liquid 101 into the cavity 114 via the inlet region 126 during the subsequent pumping cycle.

In some instances, the pump 104 may include a straw 132 coupled to the inlet region 126 to facilitate drawing the liquid 101 into the cavity 114 from a source, such as a bottle, containing multiple doses of the liquid 101. The straw 132 may be useful, for example, for facilitating fluid communication between the cavity 114 and portions (e.g., a bottom portion) of the source that may be difficult to reach. Thus, the straw 132 may facilitate making efficient use of the source of the liquid 101 and, in doing so, may increase the amount of uses between refilling the source of the liquid 101.

In general, a portion of the basin 102 defining the reservoir 108 may have any one or more of various different shapes (e.g., a bowl or a cupped-shape) as may be useful for accommodating at least a portion of the actuator 106 as the actuator 106 moves through an orifice defined by the basin 102 in the course of a pumping cycle. In particular, the portion of the basin 102 defining the reservoir 108 may be sized to accommodate at least a portion of the actuator 106 in the reservoir 108 while keeping dispensed quantities of the liquid 101 away from a user-operated portion of the actuator 106. For example, the reservoir 108 may have a first volume, the actuator 106 may be depressible in the first direction D1 (e.g., along the contact surface 129 of the actuator 106) to displace a second volume of the liquid 101 from the cavity 114 into the reservoir 108 via the first orifice 116. Continuing with this example, the first volume of the reservoir 108 may be greater than or equal to the second volume of the liquid 101 displaced from the cavity 114 into the reservoir 108, as may be useful for increasing the likelihood that the liquid 101 delivered into the reservoir 108 through a single pumping cycle will remain in the reservoir 108 until its intended use by the user. Further, or instead, the reservoir 108 may be sized such that, as the second volume of the liquid 101 is displaced from the cavity 114 into the reservoir 108, the liquid 101 remains below the contact surface 129 of the actuator 106 as the spring 112 moves the actuator in the second direction D2. As may be readily appreciated, such relative sizing may facilitate manual operation of the actuator 106 while maintaining hygienic conditions within the reservoir 108 such that, among other things, the liquid 101 to be consumed by the user is unlikely to become contaminated as a result of depressing the actuator 106. Still further or instead, the contact surface 129 of the actuator 106 may be above the first orifice 116 as the actuator 106 moves in the first direction D1 such that the liquid 101 moving into the reservoir 108 via the first orifice 116 may fall away from the contact surface 129 under the force of gravity.

In some implementations, the basin 102 may have an edge portion 122 circumscribing the actuator 106 such that the contact surface 129 of the actuator 106 is below the edge portion 122 of the basin 102 is below the edge portion 122 of the basin 102 as the actuator 106 moves back and forth in the first direction D1 and the second direction D2. With the edge portion 122 disposed about the actuator 106 in this way, the edge portion 122 may, for example, reduce the likelihood of unintended contact with the actuator 106 during and/or between uses. This may, among other things, facilitate handling the device 100 between uses.

The edge portion 122 of the basin 102 may, further or instead, be curved in a direction away from the contact surface 129 of the actuator 106. As the liquid 101 is poured from the reservoir 108 (e.g., into another container), the liquid 101 will follow the curve of the edge portion 122 in the direction away from the contact surface 129. That is, curvature of the edge portion 122 in a direction away from the contact surface 129 may facilitate keeping the liquid 101 away from the contact surface 129 as the liquid 101 is poured from the reservoir 108. This is useful for both for keeping the contact surface 129 dry and for keeping the liquid 101 from being exposed to any contaminants that may be present on the contact surface 129.

While the device 100 may be operable to draw the liquid 101 from any one or more of various different types of sources containing multiple doses of the liquid 101, it shall be appreciated that the source of the liquid 101 may advantageously be a refillable and/or replaceable source of the liquid 101, such as a bottle 140 removably securable in mechanical communication with the basin 102 with the pump 104 may be at least partially disposed in the bottle 140. The bottle 140 may be removed and replaced with another instance of the bottle 140 or with the same instance of the bottle 140. In this way, the liquid 101 may be replenished and/or changed, as is useful for promoting habitual use of the liquid 101 as part of a regular (e.g., daily) oral hygiene routine.

Referring now to FIGS. 1A-1H and FIGS. 2A and 2B, the bottle 140 may be releasably securable to the collar 231 such that the forces associated with removing and replacing the bottle 140 are primarily exerted on the collar 231, thus reducing the likelihood of damaging the pump 104 and/or the actuator 106. For example, the collar 231 may define a first opening 234. A portion of the actuator 106 may be movable through the first opening 234. Further or instead, a portion of the barrel 110 of the pump 104 may be movable through the first opening 234.

Figure 1A:
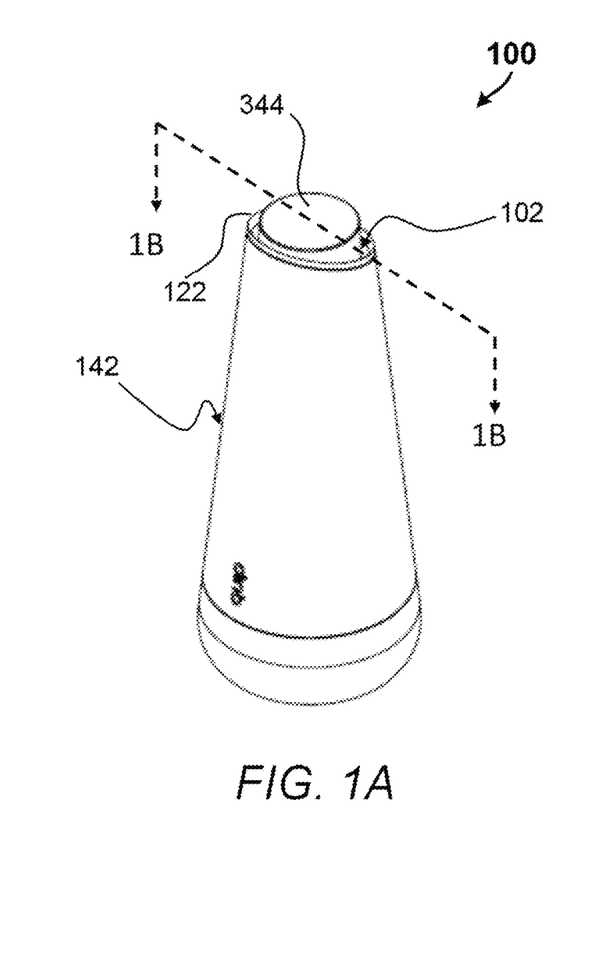
FIG. 1A is a perspective view of a device for dispensing a liquid.
Figure 1B:
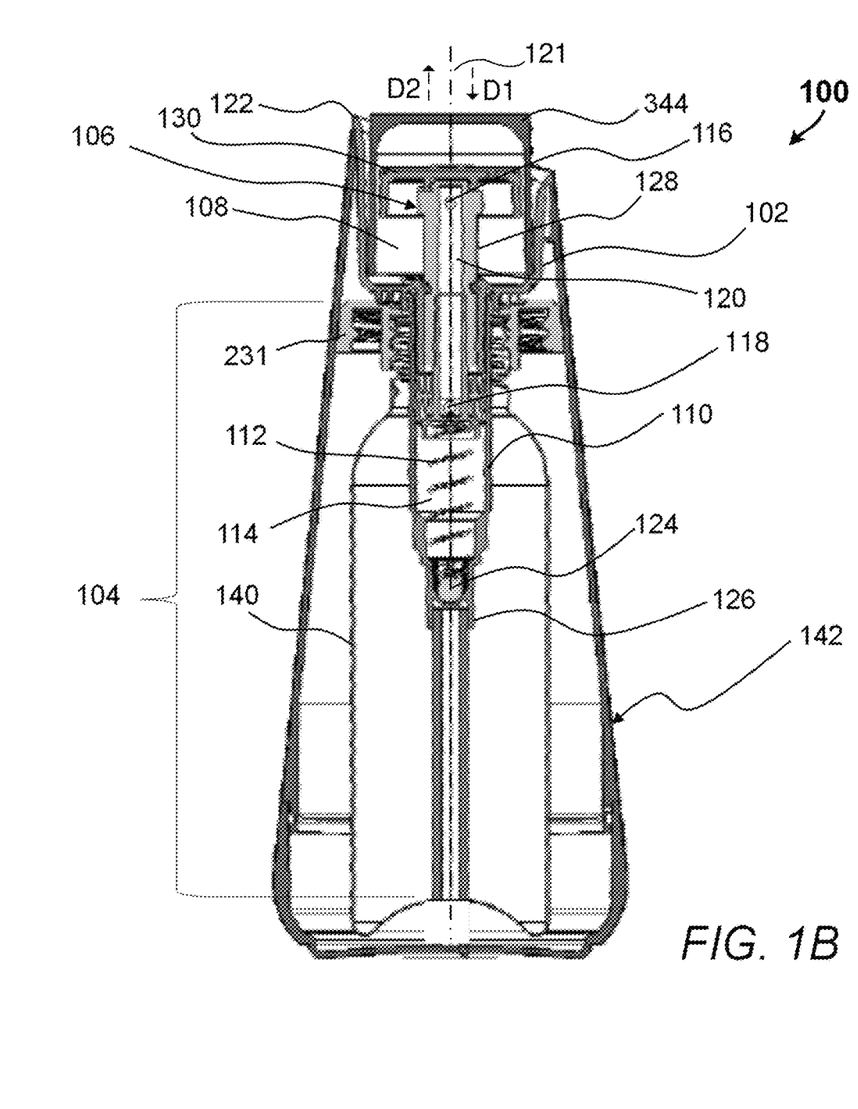
FIG. 1B is a side, cross-sectional view of the device of FIG. 1A, with the cross-section taken along 1B-1B in FIG. 1A.
Figure 1C:
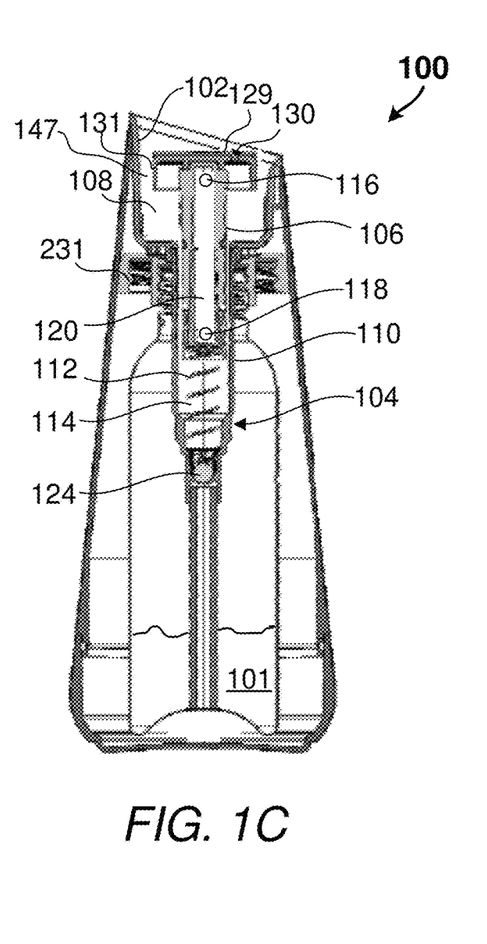
FIGS. 1C-1E are side, cross-sectional views similar to FIG. 1B, shown with a cup of the device removed, a liquid shown in a bottle, and the actuator shown, respectively, in uppermost, lowermost, and intermediate positions.
Figure 1D:
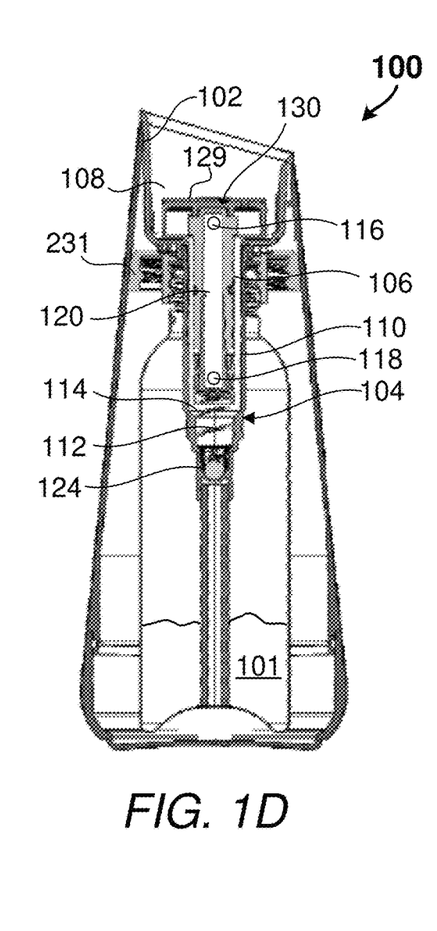
Figure 1E:
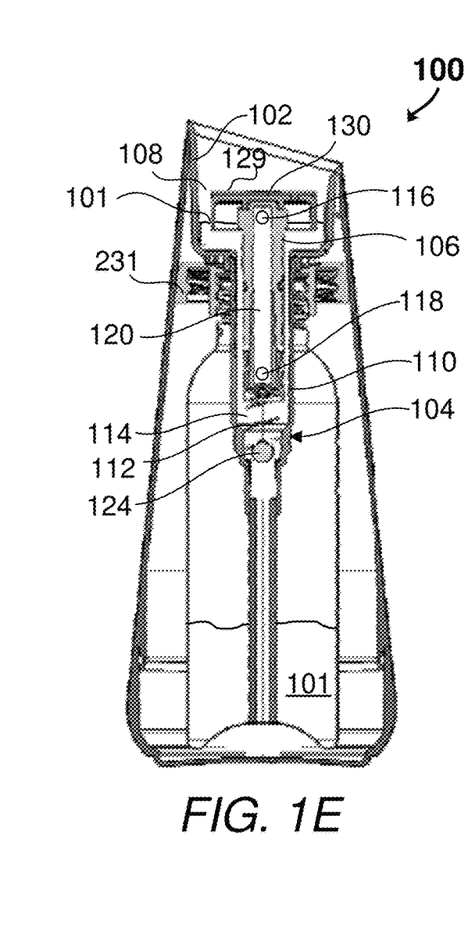
Figure 1F:
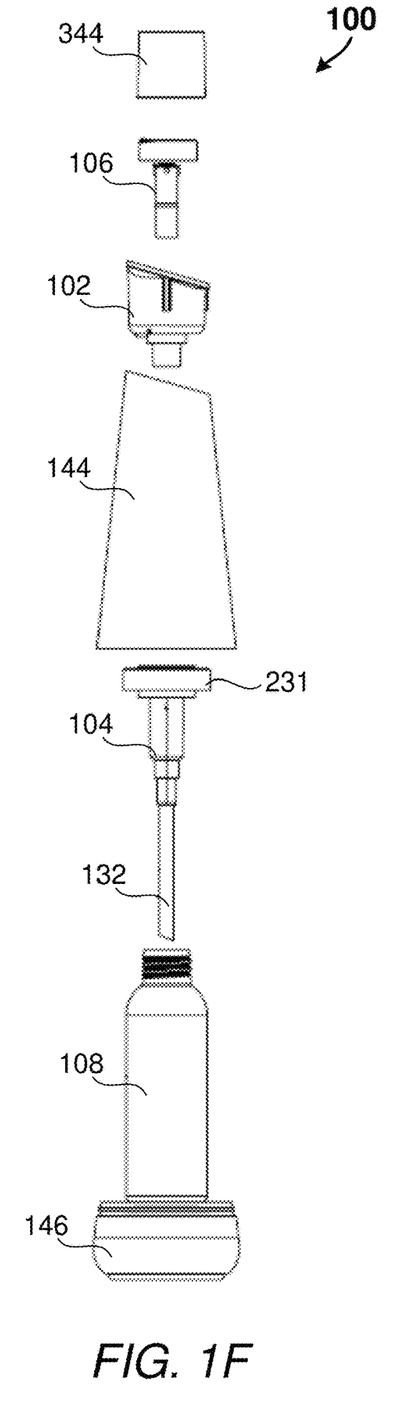
FIG. 1F is a partially exploded, side view of the device of FIG. 1A.
Figure 1G:
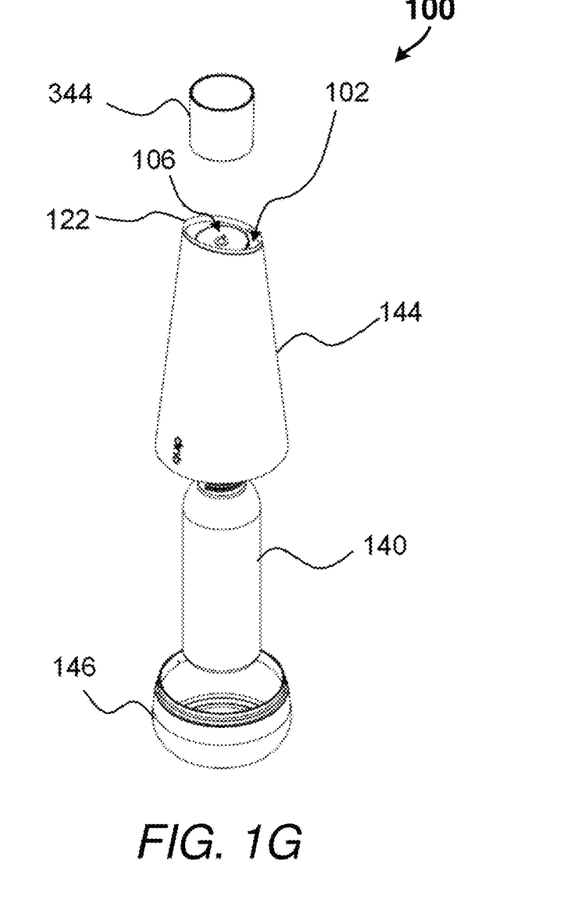
FIG. 1G is a partially exploded, perspective view of the device of FIG. 1A.
Figure 1H:
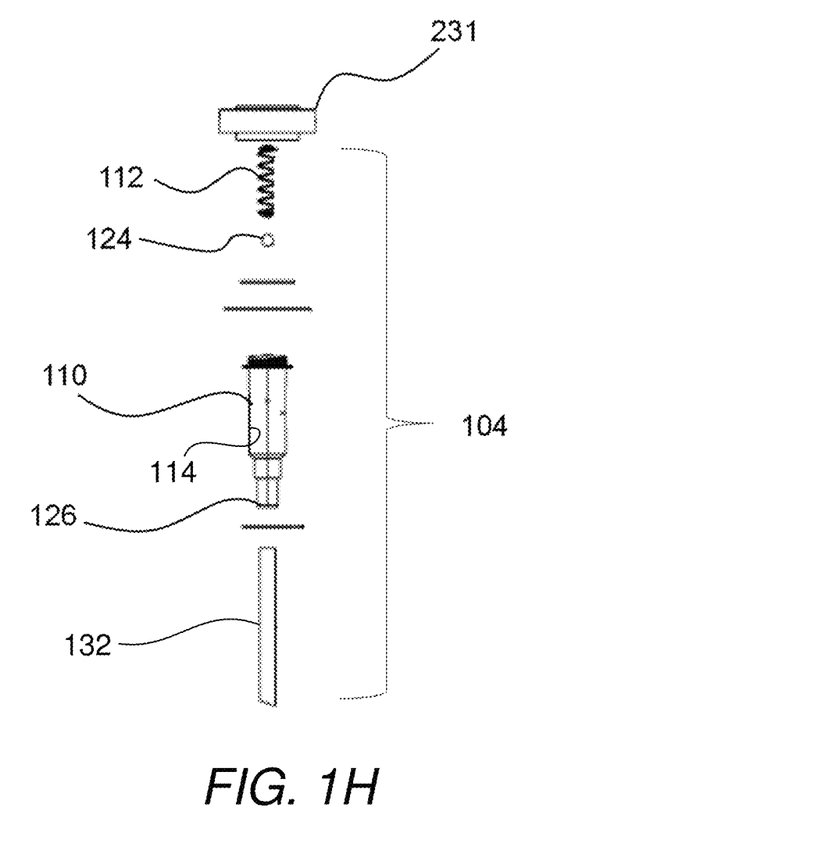
FIG. 1H is an exploded, side view of a pump of the device of FIG. 1A.
Figure 2A:
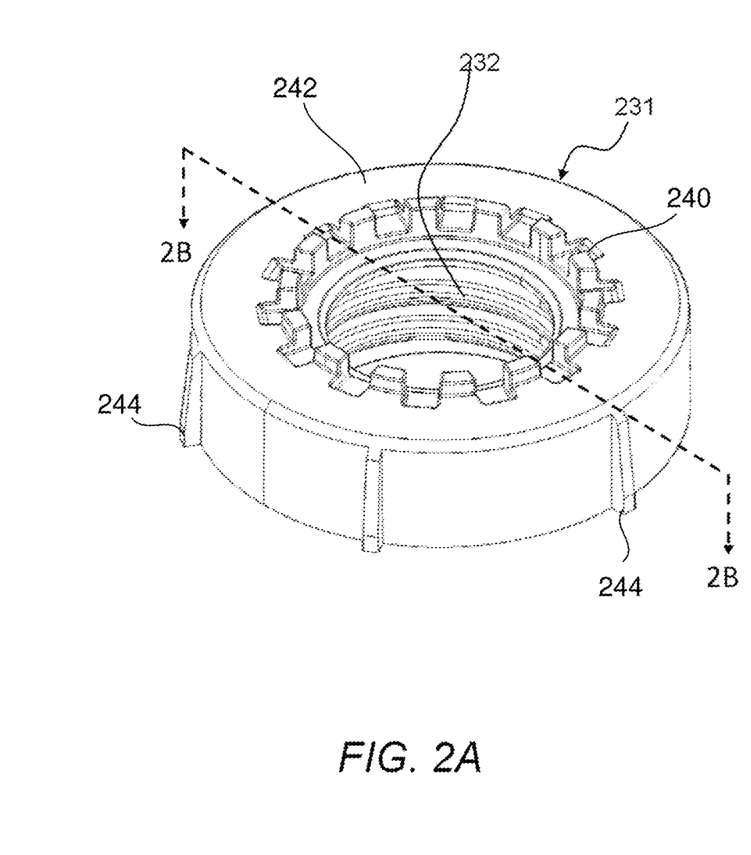
FIG. 2A is a perspective view of a collar of the device of FIG. 1A.
Figure 2B:
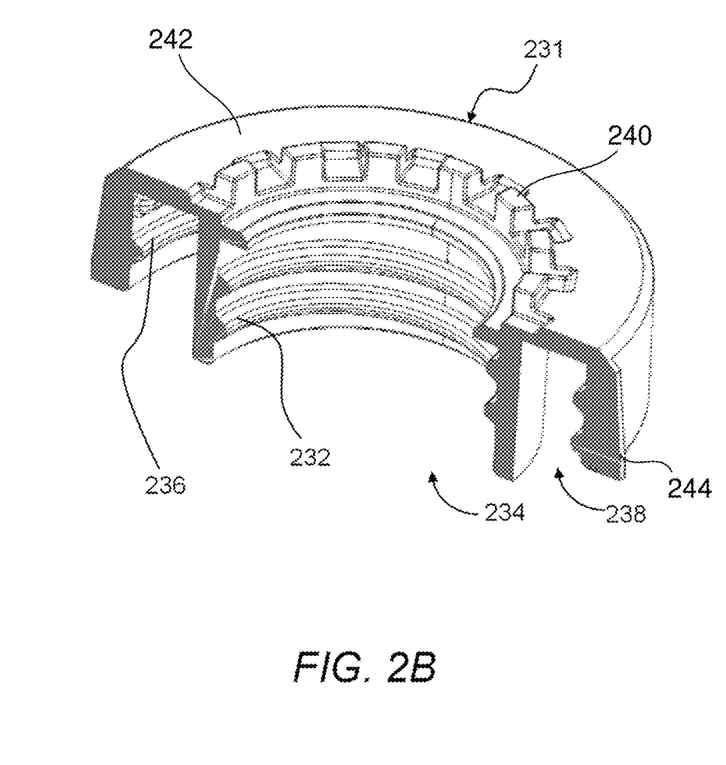
FIG. 2B is a perspective, cross-sectional view of the collar of FIG. 2A, with the cross-section taken along 2B-2B in FIG. 2A.

In some instances, the collar 231 may include a first coupling 232 releasably securable to the bottle 140. The first coupling 232 may, for example, define at least a portion of the first opening 234. As a specific example, the first coupling 232 may include a first set of screw threads sized to mate with corresponding threads on the bottle 140 such that the bottle 140 is secured to the collar 231 via the first coupling 232, and the portion of the actuator 106 movable through the first opening 234 is concentric with the first coupling 232.

Additionally, or alternatively, the collar 231 may include a second coupling 236 sized to receive an instance of the bottle 140 having a larger sized opening than an instance of the bottle 140 securable to the first coupling 232. For example, the instance of the bottle 140 securable to the second coupling 236 may provide the user with a longer duration supply of the liquid 101. In some cases, the collar 231 may define a second opening 238 concentric with the first opening 234. In some instances, the second coupling 236 may define at least a portion of the second opening 238. As a more specific example, the second coupling 236 may include a second set of threads along the second opening 238 such that the second set of threads are concentric with and circumscribe the first set of threads of the first coupling 232. Such relative orientation of the first coupling 232 and the second coupling 236, may facilitate using different sized instances of the bottle 140, as the process of aligning different sized instances of the bottle 140 with the respective one of the first coupling 232 and the second coupling 236 is similar.

While the first opening 234 extends through collar 231 to allow for fluid communication between the bottle 140 and the reservoir 108 via intervening structures described herein, it shall be appreciated that the second opening 238 does not necessarily need to extend through the collar 231, given that an instance of the bottle 140 secured to the second coupling 236 may be in fluid communication with the reservoir 108 via the first opening 234. Thus, the second opening 238 may be a blind opening and, so formed, may impart structural rigidity to the collar 231.

In some implementations, the collar 231 may additionally include fins 244 extending radially from the collar 231 to provide a friction and/or interlocking fit of the collar 231 with one or more other components of the device 100, as is useful for providing resistance forces to removal and replacement of the bottle 140. Further or instead, the collar 231 may include engagement teeth 240 in the upper collar surface 242. The engagement teeth 240 may, for example, be interlock with similar mating teeth defined by the basin 102. The engagement teeth 240, together with the mating teeth defined by the basin 102 may prevent rotational movement between the basin 102 and the collar 231, while providing a simple assembly structure that may be readily disassembled for cleaning.

In some instances, the device 100 may include a housing 142 supporting the basin 102 and, in some cases, enveloping at least a portion of one or more of the pump 104, the actuator 106, and the bottle 140. The housing 142 may be narrowest along the portion supporting the basin 102 to facilitate grasping the housing 142 to pour the liquid 101 from the basin 102. The larger dimensions of the housing 142 away from the basin 102 may, in turn, result in a center of gravity of the device 100 that is away from the basin 102, making the device 100 more difficult to topple. Further, or instead, the housing 142 may include a first section 144 and a second section 146 releasably securable to one another (e.g., through threaded engagement, an interference fit, or another toolless securing technique) to access the pump 104 and/or any one or more other components disposed within the housing 142. For example, the first section 144 and the second section 146 of the housing 142 may be released from one another to replace the bottle 140.

Referring now to FIGS. 1A-1H and FIG. 3, the device 100 may include a cup 344 that may be more facilely handled than the housing 142 for consuming the liquid 101. In some instances, the cup 344 may include indicia 345, such as volumetric gradations. Continuing with this example, the cup 344 may be used to measure a precise quantity of the liquid 101 for consumption. Further, or instead, the indicia 345 of the cup 344 may be used to facilitate accurate dilution of a concentrated form of the liquid 101.

Figure 3:
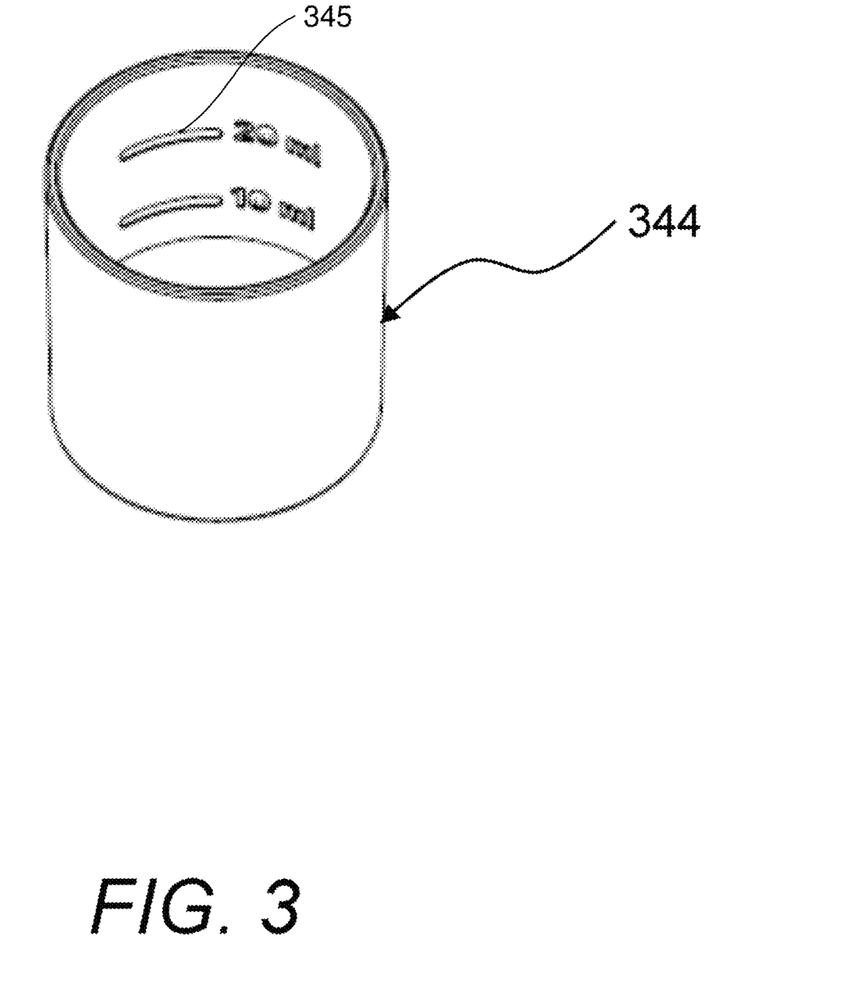
FIG. 3 is a perspective view of a cup of the device of FIG. 1A, with the cup including dosing markings.

The actuator 106 and the basin 102 may define a space 147 therebetween, and a portion of the cup 344 may be removably positioned in the space 147 to cover the actuator 106 between uses. In this position, the cup 344 may rest on the bottom of the basin 102 with the cup 344 covering the actuator 106 without touching the actuator 106. This reduces the likelihood of inadvertent contact with the actuator 106 between uses and, because the cup 344 does not touch the actuator 106, cleanliness of the cup 344 is retained for subsequent uses.

Referring now to FIGS. 4A-4E, some implementations may include methods of using the device 100. FIGS. 4A-4E are process flow diagrams showing exemplary methods 400-404 of using a device for dispensing liquids in accordance with various embodiments. With reference to FIGS. 4A-4E, unless otherwise specified or made clear from the context, any one or more aspects of the methods 400-404 may be performed by a user using the device 100 (FIGS. 1A-1H).

Figure 4A:
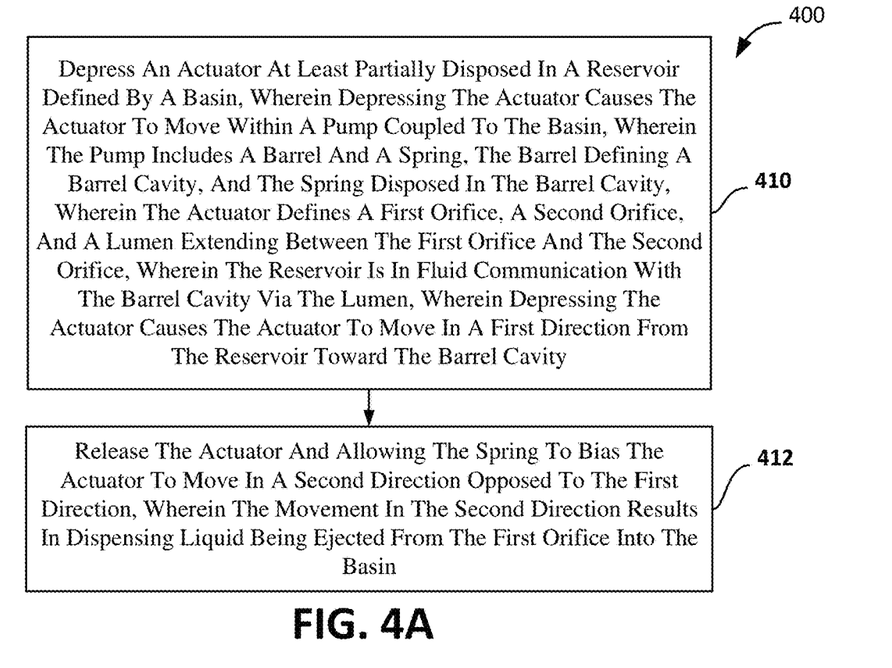
FIGS. 4A-4E are process flow diagrams of an exemplary method of dispensing a liquid.

Referring to FIG. 4A, in the method 400, in block 410 the method may include depressing an actuator at least partially disposed in a reservoir defined by a basin. Depressing the actuator may cause the actuator to move within a pump coupled to the basin, wherein the pump includes a barrel and a spring, the barrel defining a cavity, and the spring disposed in the cavity. The actuator may define a first orifice, a second orifice, and a lumen extending between the first orifice and the second orifice. The reservoir may be in fluid communication with the cavity via the lumen, such that depressing the actuator causes the actuator to move in a first direction from the reservoir toward the cavity.

In block 412, the actuator may be released, which allows the spring to bias the actuator to move in a second direction opposed to the first direction. The movement in the second direction may result in dispensing liquid being ejected from the first orifice into the basin.

Figure 4B:
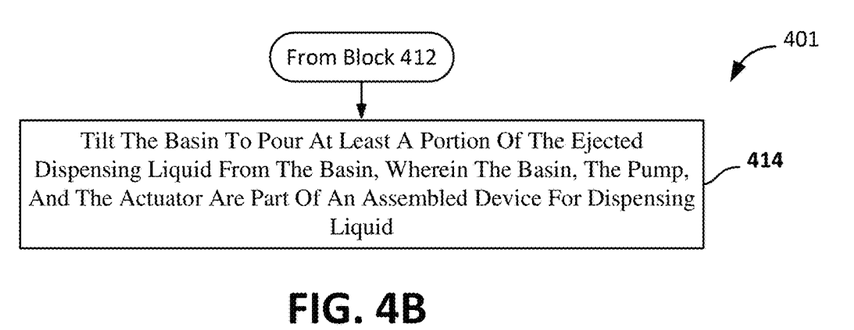

Referring to FIG. 4B, in the method 401, following the operations in block 412 of the method 400, in block 414, the basin may be tilted to pour at least a portion of the ejected dispensing liquid from the basin. The basin, the pump, and the actuator may be part of an assembled device (e.g., 100) for dispensing liquid.

Figure 4C:
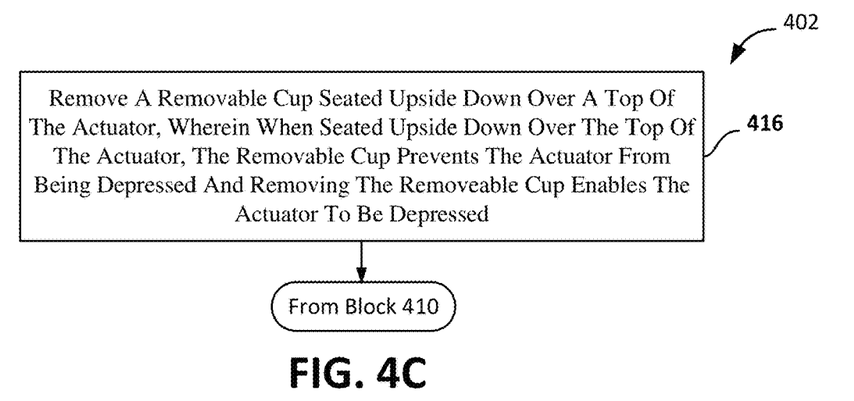

Referring to FIG. 4C, in the method 402, before the operations in block 410 of the method 400, in block 416, a removable cup (e.g., 344), which may be seated upside down over a top of the actuator, may be removed. When seated upside down over the top of the actuator, the removable cup may prevent the actuator from being depressed and removing the removeable cup enables the actuator to be depressed.

Figure 4D:
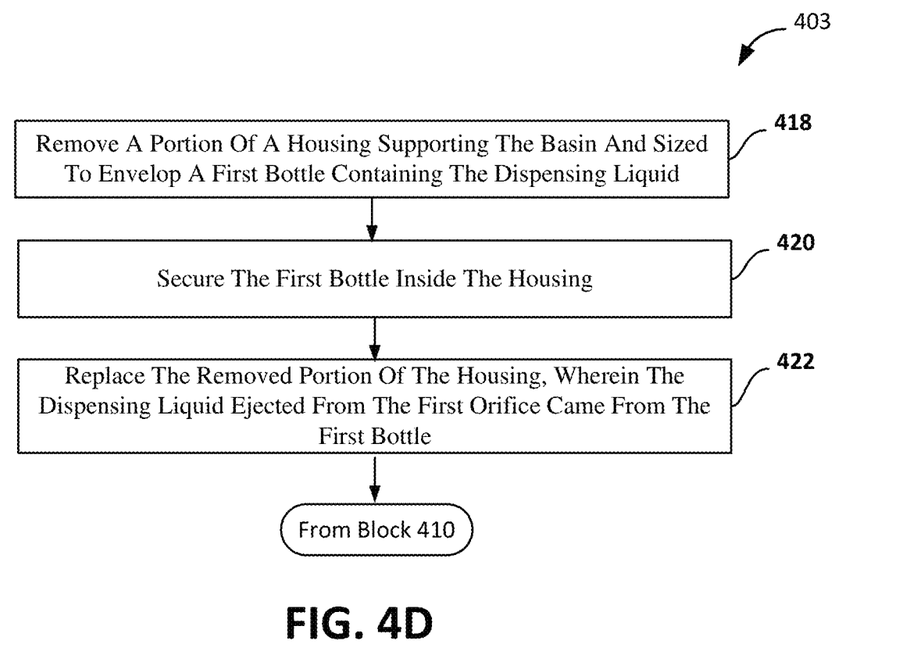

Referring to FIG. 4D, in the method 403, before the operations in block 410 of the method 400, in block 418, a portion of a housing supporting the basin and sized to envelop a first bottle containing the dispensing liquid may be removed.

In block 420, the first bottle may be secured inside the housing.

In block 422, the removed portion of the housing may be replaced. With the first bottle secured inside the housing, the dispensing liquid ejected from the first orifice may have come from the first bottle. Following the operations in block 422, the method may follow the operations in block 410 of the method 400.

Figure 4E:
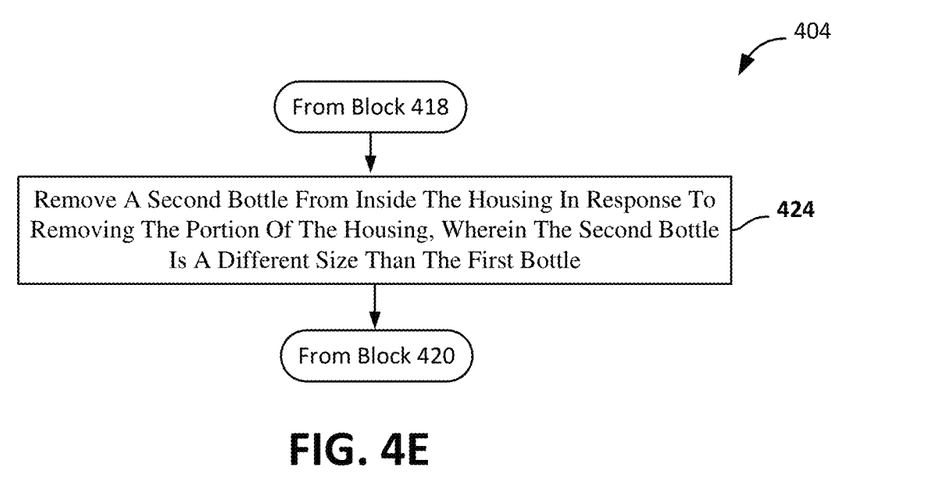

Referring to FIG. 4E, in the method 404, before the operations in block 418 of the method 403, in block 424, a second bottle may be removed from inside the housing in response to removing the portion of the housing. The second bottle may be a different size than the first bottle. Following the operations in block 424, the method may follow the operations in block 420 of the method 403.

The methods 400-404 may be repeated for dispensing additional dispensing liquid.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A device for dispensing a liquid, the device comprising:
    a basin defining a reservoir;
    a pump including a barrel and a spring, the barrel coupled to the basin, the barrel defining a cavity, and the spring disposed in the cavity; and
    an actuator at least partially disposed in the reservoir, the actuator defining a first orifice, a second orifice, and a lumen extending between the first orifice and the second orifice, the reservoir in fluid communication with the lumen via the first orifice, the actuator depressible to move the second orifice in a first linear direction defined from the reservoir toward the cavity of the barrel, and the spring of the pump biasing the actuator to move in a second linear direction defined from the cavity of the barrel toward the reservoir, wherein the actuator includes a contact surface, the actuator is depressible in response to contact by a user along the contact surface to move the second orifice in the first direction opposite the second direction, and the basin has an edge portion circumscribing the actuator such that the contact surface remains below the edge portion as the actuator moves back and forth in the first linear direction and the second linear direction.

2. The device of claim 1, wherein the first direction is opposite the second direction along an axis defined by the lumen.

3. The device of claim 1, wherein the pump further includes a stopper disposed in the cavity, the barrel defines an inlet region in fluid communication with the cavity, and the stopper is movable relative to the inlet region to control a flow of the liquid into the cavity via the inlet region.

4. The device of claim 3, wherein the spring is in mechanical communication with the stopper, and movement of the spring in the first direction defined from the reservoir toward the cavity positions the stopper along the inlet region of the cavity to restrict the flow of the liquid into the cavity via the inlet region.

5. The device of claim 1, wherein movement of the actuator in the first direction is limited to retain the first orifice in the reservoir as the actuator is depressed to move the second orifice in the first direction.

6. The device of claim 1, wherein movement of the actuator in the second direction is limited to retain the first orifice in the reservoir as the spring moves the actuator in the second direction from the cavity of the barrel toward the reservoir.

7. The device of claim 1, wherein the reservoir of the basin has a first volume, the actuator is depressible in the first direction along the contact surface to displace a second volume of the liquid from the cavity into the reservoir via the first orifice, and the first volume of the reservoir is greater than or equal to the second volume of the liquid displaced from the cavity into the reservoir.

8. The device of claim 7, wherein the reservoir is sized such that, as the second volume of the liquid is displaced from the cavity into the reservoir, the liquid remains below the contact surface of the actuator as the spring moves the actuator in the second direction.

9. The device of claim 1, wherein the edge portion of the basin is curved in a direction away from the contact surface of the actuator.

10. The device of claim 1, wherein the contact surface of the actuator is above the first orifice as the actuator moves in the first direction.

11. The device of claim 10, wherein the actuator includes a stem and a button, the stem defines the first orifice, the second orifice, and the lumen, the contact surface is along the button, and the button is coupled to the stem such that the button is depressible to move the actuator in the first direction.

12. The device of claim 11, further comprising a first set of screw threads defining a first opening, wherein a portion of the actuator is movable through the first opening.

13. The device of claim 12, wherein the portion of the actuator movable through the first opening is concentric with the first set of screw threads.

14. The device of claim 13, further comprising a second set of screw threads defining a second opening circumscribing the first set of screw threads, wherein the second set of screw threads is concentric with the first set of screw threads.

15. The device of claim 14, further comprising a bottle securable to at least one of the first set of screw threads or the second set of screw threads, wherein the pump is at least partially disposed in the bottle when the bottle is secured to one or more of the first set of screw threads or the second set of screw threads.

16. The device of claim 1, further comprising a housing supporting the basin.

17. The device of claim 16, wherein the housing includes a first section and a second section releasably securable to one another to access the pump.

18. The device of claim 1, further comprising a cup, wherein the actuator and the basin define a space therebetween, and the cup is positionable in the space between the actuator and the basin to cover the actuator.

\* \* \* \* \*